«12» United States Patent
Hoke et al.

(10) Patent No.: US 6,583,838 B1
(45) Date of Patent: *Jun. 24, 2003

(54) BISTABLE LIQUID CRYSTAL DISPLAY DEVICE USING POLYMER STABILIZATION

(75) Inventors: Charles D. Hoke, Menlo Park, CA (US); Philip J. Bos, Hudson, OH (US); Jianlin Li, Plano, TX (US)

(73) Assignee: Kent State University, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,954

(22) Filed: Feb. 22, 2000

Related U.S. Application Data (63) Continuation-in-part of application No. 08/852,276, filed on May 7, 1997.
(60) Provisional application No. 60/017,541, filed on May 10, 1996.

(51) Int. Cl.$^7$ .............................................. G02F 1/1333
(52) U.S. Cl. ..................... 349/134; 349/88; 349/156
(58) Field of Search .................. 349/134, 135, 349/88, 156, 133, 125

(56) References Cited

U.S. PATENT DOCUMENTS

| | | | |
|---|---|---|---|
| 4,101,207 A | 7/1978 | Taylor | 350/344 |
| 4,664,480 A | 5/1987 | Geary et al. | 350/350 |
| 5,453,863 A | 9/1995 | West et al. | 359/91 |
| 5,812,230 A | 9/1998 | Sakaigawa | 349/166 |
| 5,831,700 A | 11/1998 | Li et al. | 349/88 |
| 6,133,975 A | * 10/2000 | Li et al. | 349/134 |

OTHER PUBLICATIONS

"Fast and Bistable Electro–Optic Displays Using Ferroelectric Liquid Crystals", by N.A. Clark, S. T. Lagerwall, and J. Wahl, no date or publication.
"Linear electro–optic effects in polymer–dispersed ferroelectric liquid crystals", Appl. Phys. Lett. 60(25), Jun. 22, 1992, by Kitzerow, Molsen and Heppke, pp. 3093–3095.
"Polymer dispersed nematic liquid crystal for large area displays and light valves", J. Appl. Phys. 60(6), Sep. 15, 1986, by Drzaic, pp. 2142–2148.
"Polymer Encapsulated Nematic Liquid Crystals for Display and Light Control Applications", SID 85 Digest, by Fergason, pp. 68–70, no date.
"Morphological control in polymer–dispersed liquid crystal film matrices", Proc. SPIE, vol. 1080, 24 (1989), by Yamagishi, Miller and van Ast.
"LP–K: A Bistable Twist Cell Exhibiting Long–Term Bistability Suitable for Page–Sized Displays", Society for Information Display International Symposium Digest of Technical Papers, vol. XXIX, May 17–22, 1998, by C.D. Hoke and P.J. Bos, pp. 854–857.

* cited by examiner

*Primary Examiner*—Frank G. Font
*Assistant Examiner*—Andrew H. Lee
(74) *Attorney, Agent, or Firm*—Renner, Kenner, Greive, Bobak, Taylor & Weber (57) ABSTRACT

A liquid crystal display device including a polyimide alignment layer, having a bistable liquid crystal material and a polymer stabilizer in an amount effective to stabilize the liquid crystal the liquid crystal preferably having a low or medium pretilt angle to eliminate undesired states and stripe tendency and to increase hysteresis. The device has a low driving voltage, low power consumption and fast switching.

16 Claims, 8 Drawing Sheets

BISTABLE LIQUID CRYSTAL DISPLAY DEVICE USING POLYMER STABILIZATION

CROSS-REFERENCE TO RELATED APPLICATIONS

This application is a continuation in part application of U.S. Ser. No. 08/852,276, filed on May 7, 1997, allowed, which is incorporated herein by reference, which claims priority from U.S. Provisional Patent Application No. 60/017,541, filed on May 10, 1996.

GOVERNMENT RIGHTS IN THE INVENTION

The United States government has a paid-up license in this invention and may have the right in limited circumstances to require the patent owner to license others on reasonable terms as provided for by the terms of Grant DMR89-20147, awarded by the National Science Foundation.

TECHNICAL FIELD

The present invention relates generally to liquid crystalline light modulating devices, and more specifically to polymer stabilized bistable liquid crystalline devices which eliminate an undesired state in their displays.

BACKGROUND OF THE INVENTION

Several applications of nematic liquid crystal devices have been reported that utilize bistability. This feature is important, since it provides a pronounced memory of the last imprinted ON-OFF state to the resulting display, in the absence of any field.

However, a characteristic of certain of these bistable devices is that a high pretilt angle is required in order to avoid stripe formation. As a result, the devices were constructed using evaporated SiO as the alignment layers. Such a procedure, however, is an elaborate and expensive process.

A more economical approach to liquid crystal device fabrication is the use of polyimide alignment layers. However, stripe formation in the resulting display is always a concern when using standard polyimide alignment layers. It would be desirable, therefore, to provide a liquid crystal device containing liquid crystal material exhibiting bistability which is capable of being economically fabricated, while avoiding stripe formation.

Figure 7:
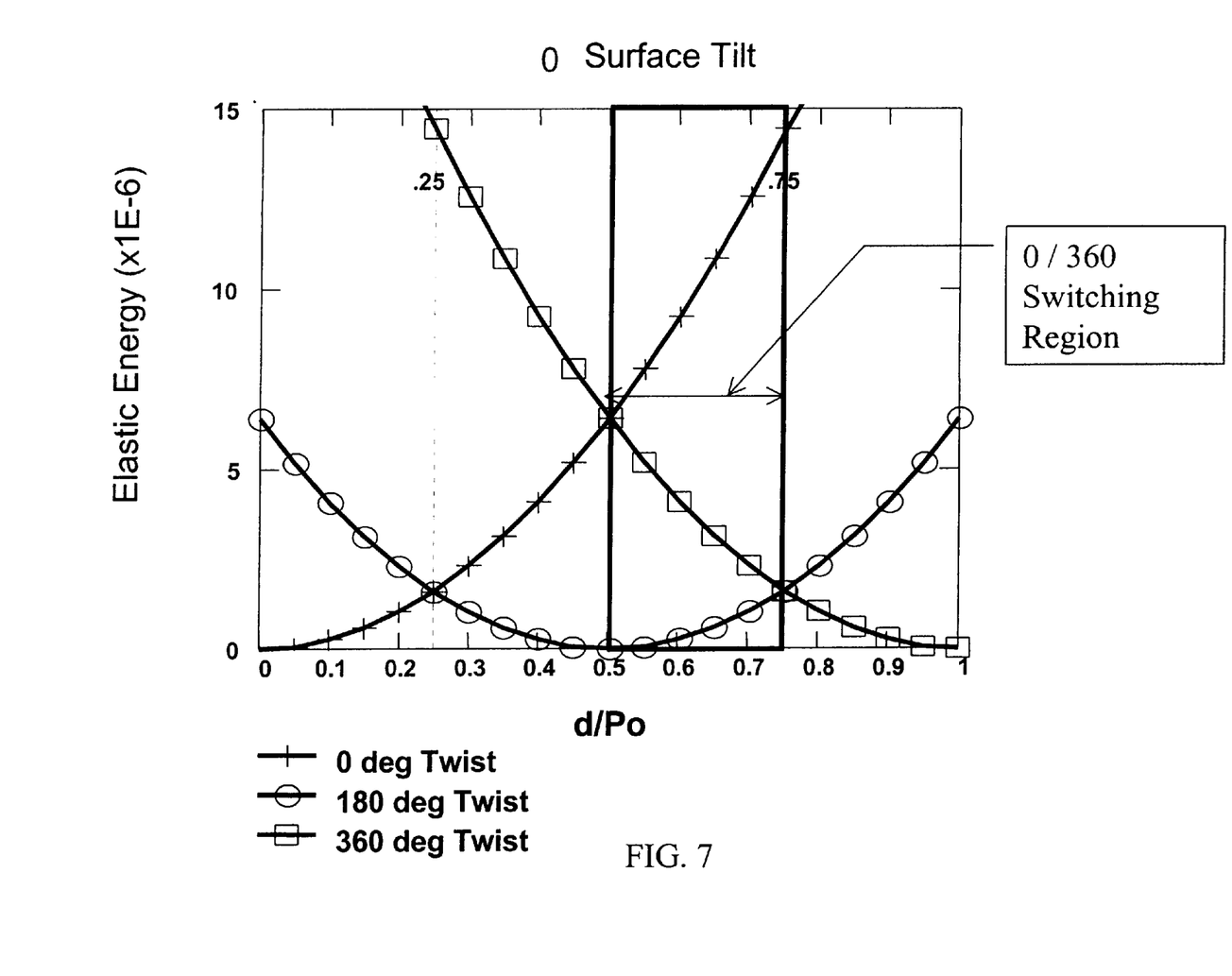
FIG. 7 shows a graph of calculated elastic energy of equilibrium at the 0°, 180°, and 360° twist states for liquid crystal ZLI4792.

Another problem with prior art displays is the formation of undesired states for the liquid crystal. After removing a large field (approximately 40V), a type of liquid crystal display can relax into one of two desired states having a twist angle of $\phi$ and $\phi+360°$, wherein $\phi$ is in the range of 0° to 180°. As an example, consider the case where $\phi=0°$. The backflow effect can be utilized to switch between the two states of 0° and 360° twist; however, the cell thickness to pitch ratio ($d/P_0$) where switching occurs in this type of device (see FIG. 7) is also where the energy of an undesired intermediate twist state (180° for the case considered here) is lower than that of either the 0° or the 360° states. This effect has required that after a short period of time (about 1–2 seconds) domains of the unwanted 180° state will grow back and "erase" information present on the display. It is possible to refresh the display every 1 to 2 seconds to eliminate this problem; however, this technique substantially increases power consumption and the refreshing occurs at a rate which is distracting to a viewer.

Another technique used to overcome this 180° twist state formation was the creation of a high pretilt angle in the spacing between the pixels. The high pretilt significantly increases the energy of the 180° twist state thus inhibiting its formation. However, this method requires expensive and difficult manufacturing techniques.

SUMMARY OF THE INVENTION

It is an object of the present invention to provide a bistable liquid crystal device which substantially eliminates undesired states.

The present invention provides a liquid crystal display device including a polyimide alignment layer, having a bistable liquid crystal material and a polymer stabilizer in an amount from about 1% to about 15% based on the total weight of polymer and liquid crystal material, wherein the liquid crystal provides a twist angle from 0° to 360°.

DESCRIPTION OF PREFERRED EMBODIMENTS

The liquid crystal display device of the present invention includes a polyimide alignment layer, and contains a bistable liquid crystal material and a polymer stabilizer in an amount effective to stabilize the liquid crystal associated with the liquid crystal material.

The liquid crystal material is a chiral nematic liquid crystal, including chiral material in an amount effective to form a twist angle from 0° to 360°. Preferably, the twist angle is 0° or 360°. The chiral material can also be present in an amount effective to form twist angles of φ and φ+360°, wherein φ is an angle from about 0° to about 180°. Suitable liquid crystals include those conventionally used in super twist nematic (STN) displays. According to the present invention, the liquid crystal material may have a low or medium surface pretilt angle in the liquid crystal device. Preferably the pretilt angle may be about 5°.

The polymer stabilizer stabilizes the state of the liquid crystal in the absence of an applied field, and permits the liquid crystal to change states in the presence of an applied field. Generally, it is present in an amount of from about 1% to about 15%, preferably about 1% to about 4%, based on the total weight of polymer and liquid crystal material. The polymer stabilizer is preferably a polymerizable monomer that dissolves into and is aligned with the liquid crystal, and is preferably a UV curable acrylate, such as a diacrylate.

The polyimide alignment layers are preferably antiparallelly rubbed on opposing substrates. The transparent substrates may be glass or plastic. The chiral nematic liquid crystal display device has a cell thickness to pitch ratio less than or equal to about 1.25, preferably about 0.6 to about 0.9.

Figure 6:
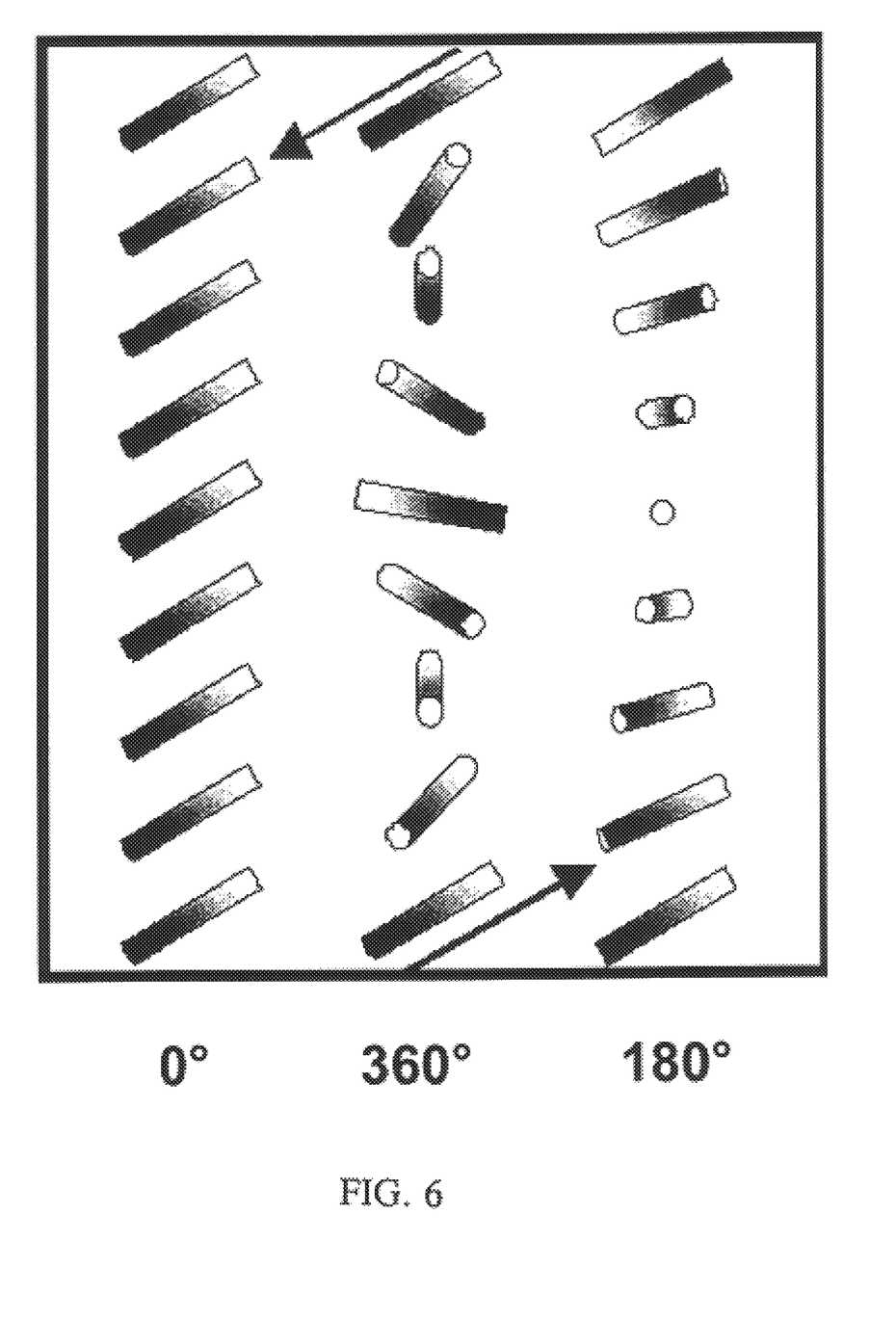
FIG. 6 shows director configurations at 0°, 360°, and 180° twist.

In FIG. 6, director configurations of 0°, 360°, and 180° are shown. Both the 0° and the 360° configurations are topologically equivalent. This means that they can be continuously transformed from one to the other without the formation of a disclination line. The 180° twist state is topologically distinct from both the 0° and 360° states. As a result, the 180° state becomes unstable in the presence of high fields with the boundary conditions shown in FIG. 6.

EXAMPLE 1

A 7 microns thick, 80 dpi 160×160 matrix display was constructed by the following procedure. The device was constructed using two pieces of indium tin oxide (ITO) coated glass substrates having an antiparallelly rubbed Nissan SE-610 polyimide coating. Seven (7) micron glass fiber spacers were used to maintain the glass substrates in a spaced apart relationship and form the cell. The liquid crystal material that was to be introduced into the cell was ZLI-1694, with a chiral additive, CB15 from E. Merck. The d/p ratio was 0.88, so the pitch was 7.95 microns. A two (2) weight percent photocurable diacrylate monomer, Desolite 2002-33 available from DSM Desotech Co., was added to the liquid crystal mixture before it was degassed, vacuum filled, squeezed and sealed. The device was then exposed to UV light for approximately 10 minutes (3 mw/cm$^2$) with a voltage of 15 V applied to it.

Figure 1:
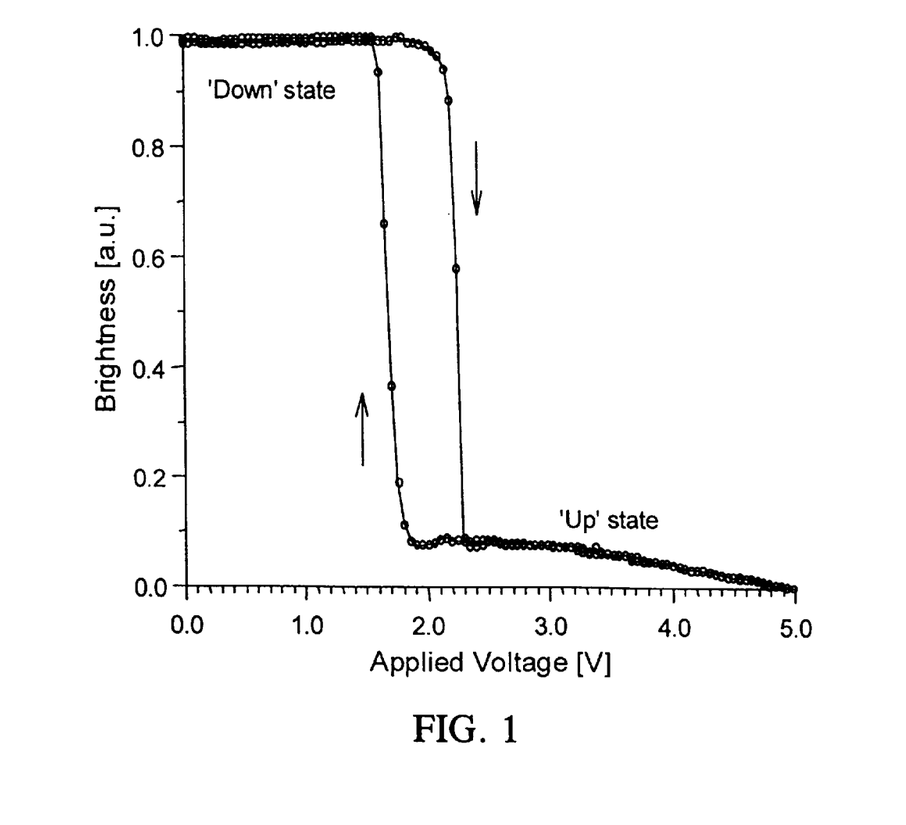
FIG. 1 is an electro-optic curve showing hysteresis for the polymer stabilized bistable display, plotting brightness versus applied voltage.

The polymer stabilized liquid crystal display cell produced in the above Example was analyzed for hysteresis by comparing display brightness at various applied voltages. FIG. 1 shows the electro-optic curve that was taken with the cell between a pair of crossed polarizers. When a holding voltage of $V_H$ equal to 2.1 volts was applied to a pixel, the pixel stayed at black (normal white mode) after a short pulse of $2V_H$ (effective voltage is 4.2 volts) was applied, the pixel stayed at white after a short pulse of $V_H$ (effective voltage is zero volts) was applied. The total ramp time was 5 minutes.

This device had very sharp thresholds and the voltage windows for hysteresis was large enough for an easy holding voltage selection and small enough for easy addressing (2:1 addressing was used in this case). The device could be switched between black and white and stayed that way with 4.2 volts or zero volts pulses applied.

The switching time for the on and off states are not the same for the inventive matrix device due to the presence of polymer network, as for the device without polymer stabilization. The switch on time is about 7 ms and switch off time is about 25 ms.

The mechanism behind the bistability of this type of device can be explained by 'up' and 'down' states of the mid-plane tilt. When a high electric pulse is applied to the cell and then drops to the holding voltage, the mid-plane director tilt angle is almost perpendicular to the surface. This is the 'up' state. When a zero field pulse is applied to the cell and then stays at holding voltage, the mid-plane director tilt angle is almost parallel to the surface. This is the 'down' state.

Figure 2A:
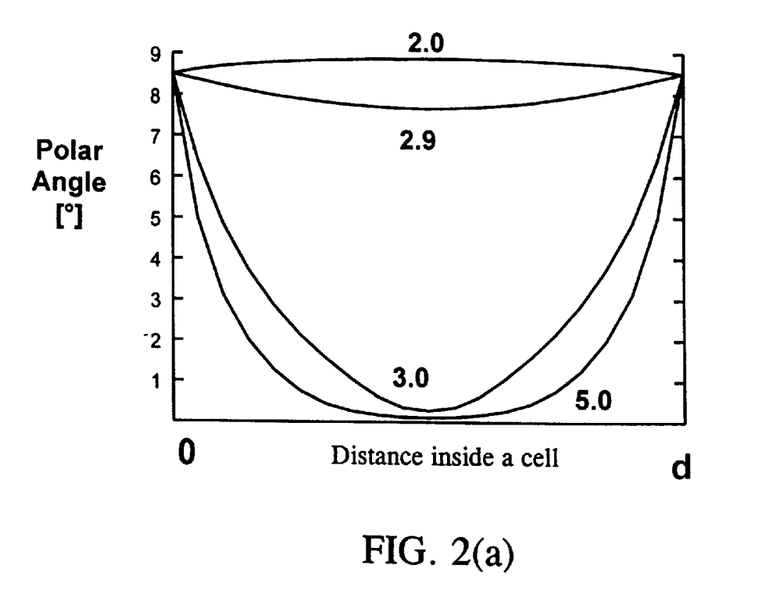
FIG. 2(a) is a graph of director configurations (polar angle) showing the hysteresis of a 360° twist nematic cell, in which the applied voltage increases from 0 V to 5 V.

In FIG. 2(a) and (b), the tilt angles across the cell as a function of applied voltage are plotted for two different situations. One is for the increasing applied voltage case, FIG. 2(a): and the other is for the decreasing applied voltage case, FIG. 2(b).

By changing the applied voltage from 0 V to 5 V with 0.1 V increments, the director configurations were obtained for each voltage and the system free energy density was calculated as well as the elastic energy density for that voltage. The same process was then repeated for applied voltage from 5 V to 0 V.

The material constants for the liquid crystal ZLI-1694 were used for the analysis. The surface condition was assumed as hard anchoring which is commonly used in display modeling programs. The twist angle and the surface pretilt angle of the cell were 360° and 5°, respectively. The thickness to pitch ratio was 0.88. The simulation was done by minimizing the Frank free energy using a numerical dynamic relaxation technique.

Figure 2B:
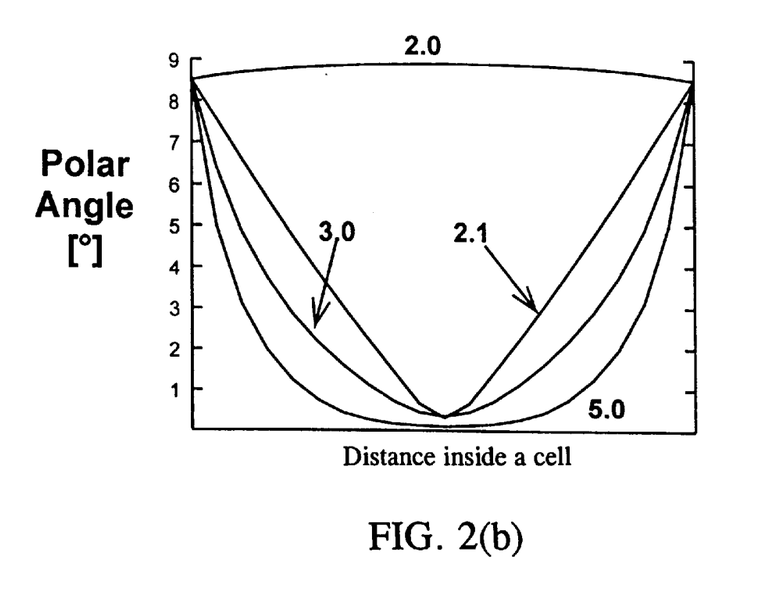
FIG. 2(b) is a graph of director configurations (polar angle) showing the hysteresis of a 360° twist nematic cell, in which the applied voltage decreases from 5 V to 0 V.

The obtained director configurations are plotted in FIGS. 2(a) and 2(b) respectively. In the applied voltage region of 2.1 V to 2.9 V, the director configuration for a given value has two different shapes depending on the initial condition. When the applied voltage is increased from 0 V to less to 2.9 V, the director configurations are almost identical with the mid-plane tilt angle parallel to the surface; when the applied voltage reaches 3.0 V, the effect of applied electric field causes the director configuration to have a significantly different shape than that of 2.9 V, with the mid-plane tilt angle at almost perpendicular to the substrate surface.

On the other hand, when the applied field is decreased from 5.0 V, the mid plane tilt angle stays perpendicular to the surface until the applied voltage drops down to 2.0 V. During the process, the magnitude of the polar angle gradient has the largest value at the surface and becomes smaller gradually to mid-cell. At 2.1 V; the gradient throughout the cell has the same magnitude except at the mid-cell where it is still zero. The optical effect of hysteresis of the director configurations is that the display could be bright or dark in between a pair of crossed polarizers depending on different initial voltages.

Within the bistable range, from FIG. 2(a) and 2(b), the energy for the mid-plane tilt angle to stay at parallel to the surfaces is lower than the mid-plane tilt angle to stay at perpendicular to surfaces, which generates significantly more strain energy. In other words, the 'down' state is the preferred state after the device has been held for a long time. The matrix device was viewed after it had been held at VH for up to five minutes (the limit of driving equipment). For the 'down' state hold, there was no 'up' state growth after five minutes hold. For the 'up' state hold, the down state area increased slowly from the walls and spacers. After five minutes hold, the pixels were 80% 'up' state area and 20% 'down' state.

Figure 3A:
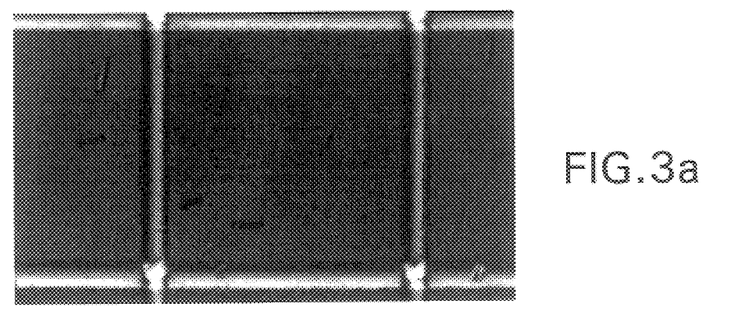
FIG. 3(a) is a microphotograph of the inventive matrix device showing the picture (black) of 4.2 volts applied, taken through a pair of crossed polarizers (45° with rubbing direction).
Figure 3B:
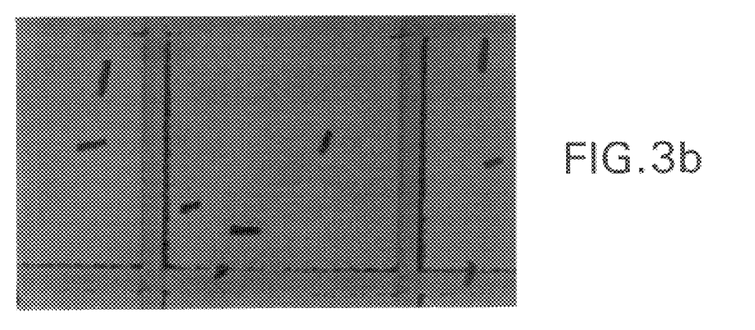
FIG. 3(b) is a microphotograph of the inventive matrix device showing the picture (white) when no field is applied (black dots are. spacers) taken through a pair of crossed polarizers (45° with rubbing direction).

In FIGS. 3(a) and (b), microphotographs of the matrix device are shown, taken through a pair of crossed polarizers (45° with rubbing direction). FIG. 3(a) shows the picture of 2VH applied voltage that is black between a pair of polarizers (4.2 volts applied). The grids are the area where the ITO was etched out. FIG. 3(b) shows the picture of no field is applied which is white (black dots are spacers).

Figure 4A:
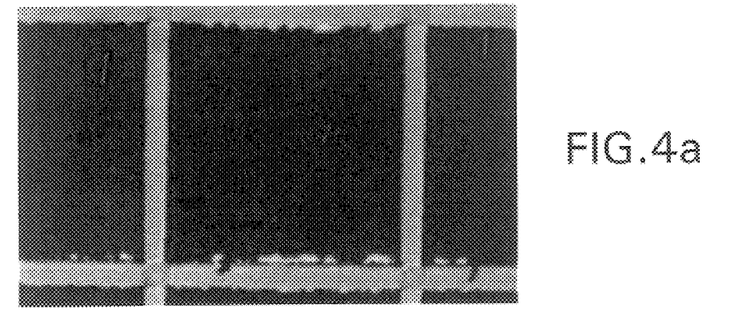
FIG. 4(a) is a microphotograph taken through a pair of crossed polarizers (45° with rubbing direction) 5 seconds after a 4.2 volts pulse (7 ms) was applied, showing the picture (black) of an applied 2.1 volts holding voltage.
Figure 4B:
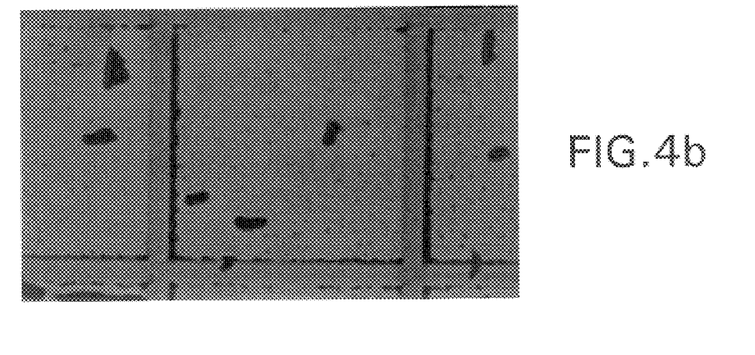
FIG. 4(b) is a microphotograph taken through a pair of crossed polarizers (45° with rubbing direction) 5 seconds after a zero volt pulse (25 ms) was applied, showing the picture (white) of an applied 2.1 volts holding voltage.

In FIG. 4, microphotographs taken through a pair of crossed polarizers (45° with rubbing direction) are shown for 'up' and 'down' states of the inventive device when a holding voltage VH (2.1 volts) is applied. FIG. 4(a) shows the picture for the 'up' state of the device 5 seconds after a short pulse (7 ms) of +VH (effective voltage of 2 VH volts) was applied. FIG. 4(b) shows the picture for the 'down' state of the inventive device 5 seconds after. a short pulse (25 ms) of −VH (effective voltage zero volts) was applied. No stripes were observed.

Figure 5:
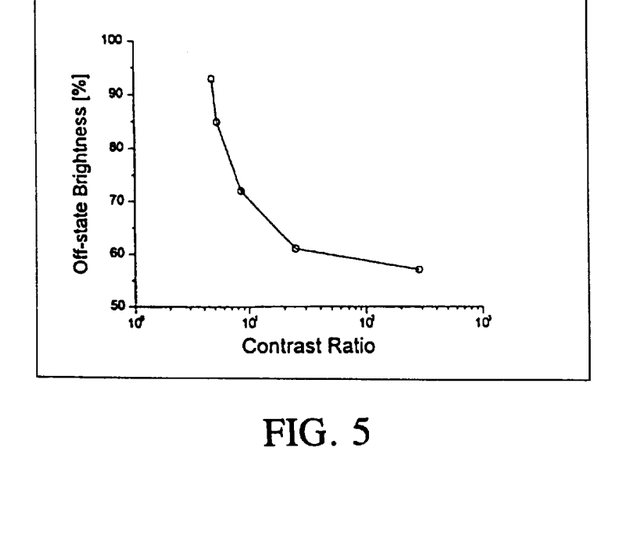
FIG. 5 is a graphical representation of the off-state brightness versus contrast ratio for different polarizers settings.

This embodiment of the inventive device had a yellowish appearance when placed between crossed polarizers. The And value for this device is 0.903 microns. It has a high brightness with an acceptable contrast ratio. The optimization for brightness and contrast ratio was performed by rotating the sample in-between a pair of crossed polarizers. The contrast ratio for the two states is 5:1 when the crossed polarizers positions (45° with cell rubbing direction) were optimized for brightness (93% transmittance at off-state), 286:1 when the crossed polarizers positions (parallel or perpendicular with cell rubbing direction) were optimized for maximum contrast ratio (57% transmittance at off-state). An off-state brightness (green 550 nm filter S was used) versus the contrast ratio curve for various polarizers settings is shown in FIG. 5. (100% transmission corresponds to the transmission of an empty LCD with parallel polarizers attached.)

To demonstrate the use of the device of the present invention for a black and white display, a procedure of optimizing for the brightness by varying And values and polarizers angles was followed. A 50% transmittance brightness was obtained for white at (CEI-x,y)=(0.303, 0.330), with a head-on contrast ratio of 46:1. The optimized And value was 0.643pm with polarizer and analyzer angles at 85° and 175° respectively.

EXAMPLE 2

Wedge cells were constructed using polyimide and indium tin oxide (ITO) coated glass plates. Nissan SE-3510 polyimide (Nissan Chemical) was hand rubbed and the plates assembled such that the rub direction was opposite on the two plates. The pretilt angle created by the alignment layers was in the range of 4° to 7°. The cell spacing of the resultant wedge cell varied from approximately 2 $\mu$m to 8 $\mu$m. The cells were capillary filled with the following mixture: 93.9% ZLI-5049-100 liquid crystal (Merck), 1.7% S811 chiral additive (Merck), 4% reactive liquid crystal monomer BDH-82 (Merck), AND 0.4% BME photoinitiator (Aldrich Chemical). The calculated pitch of the liquid crystal mixture was about 5.4 $\mu$m.

A mask was used to create polymer rich walls with a pixel size of 400 $\mu$m×400 $\mu$m with a 200 $\mu$m spacing between the pixels. The cells were covered with the mask and exposed using an Oriel collimated light source with an output flux density of 2mW/cm$^2$ for 15 minutes. During the UV exposure, an AC RMS voltage of 20V was applied to the cell so that the polymer walls, when formed, would lock in the high tilt of the liquid crystal at that applied field.

Figure 8:
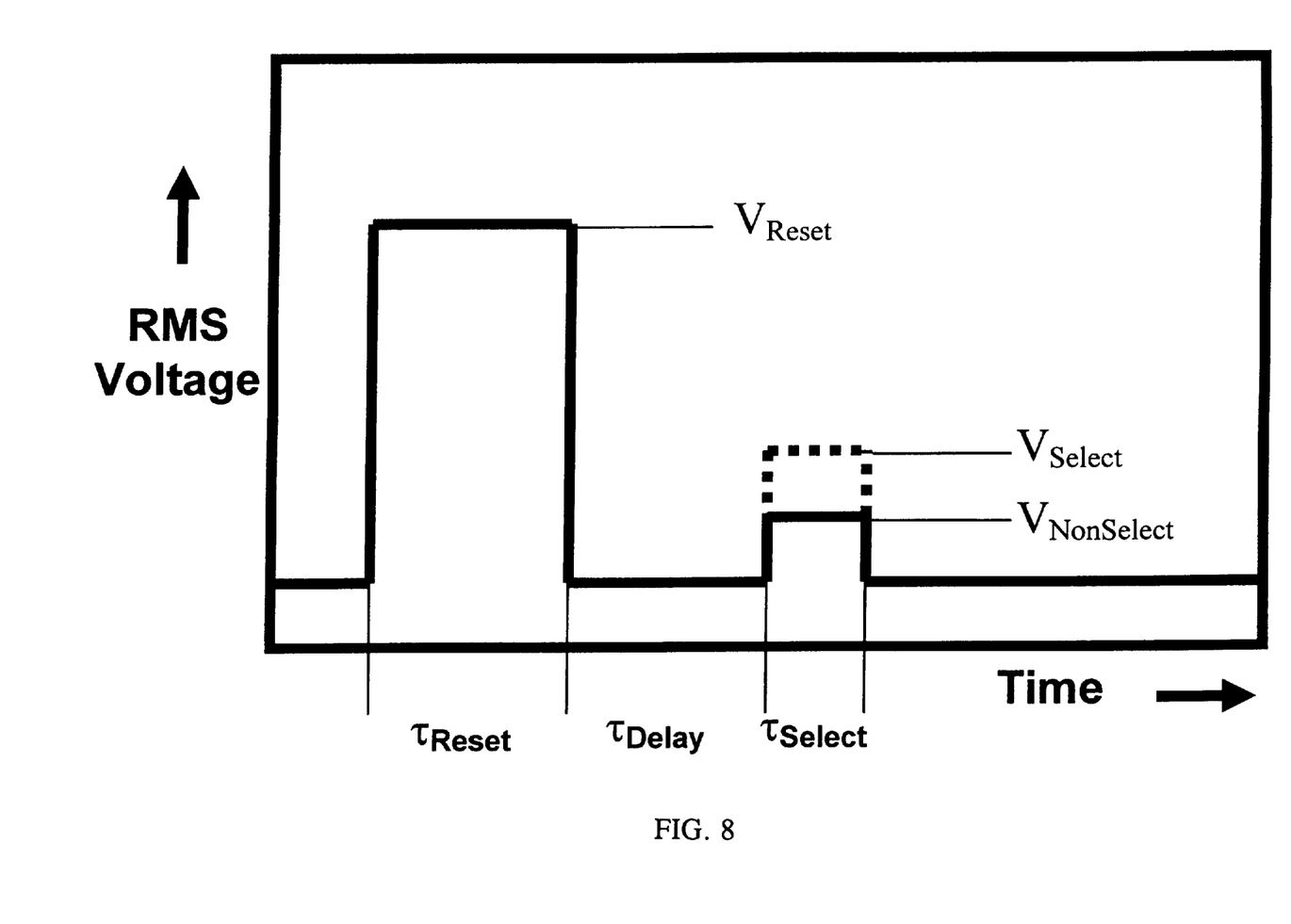
FIG. 8 is a graph of matrix waveforms for addressing a polymer stabilized bistable twist cell.

The device was then tested to determine the effect of the polymer stabilization on the addressing capabilities of the device. The matrix waveforms shown in FIG. 8 were applied to the display to quantify the addressing parameters. The addressing parameters were optimized, and the results are listed below in Table 1. The definition of the measurements are shown in FIG. 8.

TABLE 1

| | |
|---|---|
| $V_{Reset}$ | 40 V |
| $V_{Select}$ | 8 V |
| $V_{NonSelect}$ | 4 V |
| $\tau_{Reset}$ | 1.67 ms |
| $\tau_{Delay}$ | 1.33 ms |
| $\tau_{Select}$ | 330 $\mu$s |

It was found that if a pipeline approach was used for addressing a matrix display, the line access time was only the selection interval of the waveform. In this instance, a 1000 line display was updated in approximately 300 ms. This performance was comparable to a polymer free bistable twisted nematic cell.

Figure 9A:
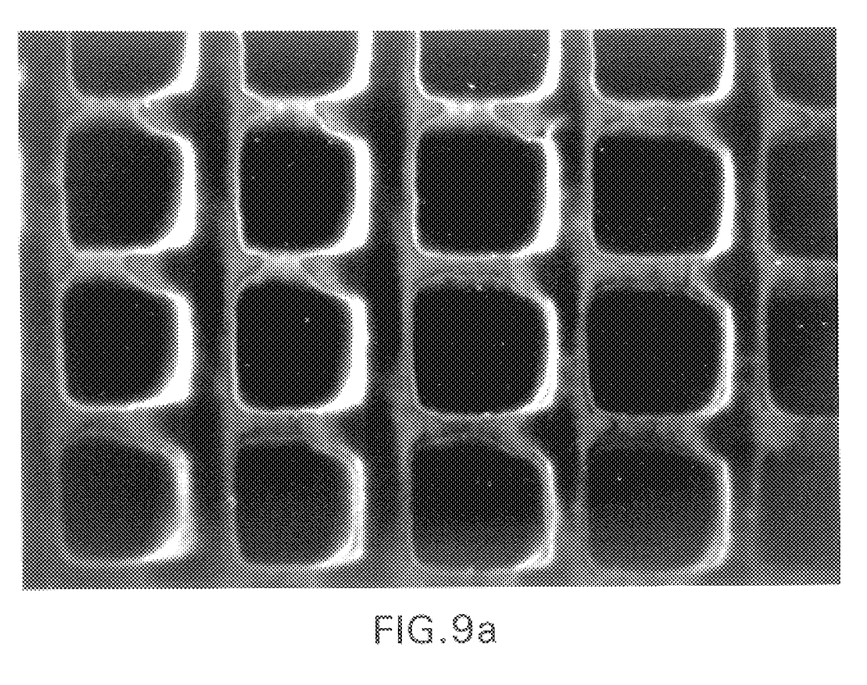
FIG. 9(a) is a photomicrograph of the 0° state for a polymer stabilized bistable twist cell.
Figure 9B:
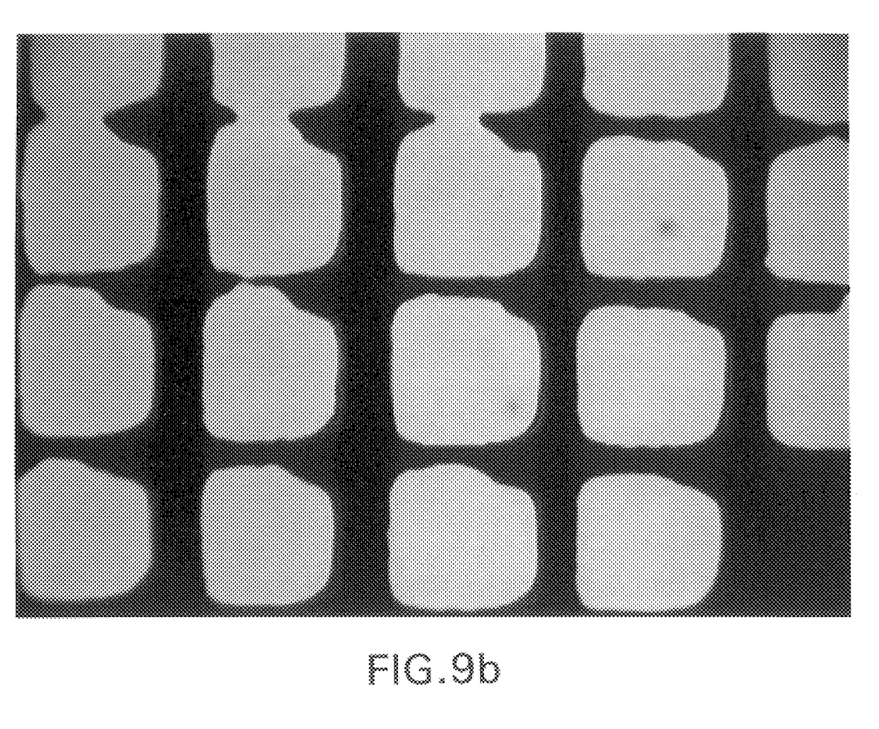
FIG. 9(b) is a photomicrograph of the 360° state for a polymer stabilized bistable twist cell.

Next, long term bistability was tested. The display was addressed with the waveform shown in FIG. 8 to characterize the d/P$_0$ window for the long term bistability and to confirm that the states were stable. FIG. 9 shows the same group of pixels after selecting the 0° state (FIG. 9(a)) and the 360° state (FIG. 9(b)). The photographs were taken 10 minutes after being addressed. No degradation was observed even after several hours. This indicated that the bistability is long term.

An estimate was made of the d/P$_0$ window in which the long term bistability occurs. The data showed that in the range of 0.625<d/P$_0$<0.675 both the 0° and the 360° states were stable. This yielded a cell gap range of about 3.4 to about 3.6. This range is consistent with preferred tolerances for manufacturing STN displays.

The inventive bistable liquid crystal display has advantages over prior bistable liquid crystal displays. It uses the standard rubbed polyimide as alignment layers and has very low driving voltage, on the same order as STN devices which enable the use of commercially available, low-cost STN driver chips. Its low power consumption and fast-switching makes it a very good candidate for a page-size viewer.

Thus, the objects of the invention are accomplished by the present invention, which is not limited to the specific embodiments described above, but which includes variations modifications and equivalent embodiments defined by the following claims.

What is claimed is:

1. A liquid crystal display device including a polyimide alignment layer, having a bistable liquid crystal material and a polymer stabilizer in an amount from about 1% to about 15% based on the total weight of polymer and liquid crystal material, wherein the liquid crystal provides a twist angle from 0° to 360°.

2. The liquid crystal display device of claim 1 wherein the polymer stabilizer stabilizes the state of the liquid crystal in the absence of an applied field, and permits the liquid crystal to change states in the presence of an applied field.

3. The liquid crystal display device of claim 1 wherein the polymer stabilizer is present in an amount of from about 1% to less than 4% based on the total weight of polymer and liquid crystal material.

4. The liquid crystal display device of claim 1 wherein the polymer stabilizer is present in an amount of from greater than 4% to about 15% based on the total weight of polymer and liquid crystal material.

5. The liquid crystal display device of claim 1, wherein the liquid crystal has a low pretilt angle.

6. The liquid crystal display device of claim 1, wherein the liquid crystal has a medium pretilt angle.

7. The liquid crystal display device of claim 1 wherein the liquid crystal material is a chiral nematic liquid crystal, including chiral material in an amount effective to form twist angles of $\phi$ and $\phi+360°$, wherein $\phi$ is an angle from about 0° to about 180°.

8. The liquid crystal display device of claim 1 wherein the liquid crystal material is a chiral nematic liquid crystal, including chiral material in an amount effective to form a twist angle of 360°.

9. The liquid crystal display device of claim 7 having a cell thickness to pitch ratio of greater than or equal to about 0.5 to less than or equal to about 1.25.

10. The liquid crystal display device of claim 8 having a thickness to pitch ratio of about 0.6 to about 0.9.

11. The liquid crystal display device of claim 1 wherein the surface pretilt angle is about 5°.

12. The liquid crystal display device of claim 1 wherein the polyimide alignment layers are antiparallelly rubbed on opposing substrates.

13. The liquid crystal display device of claim 11, wherein the substrates are transparent substrates selected from the group consisting of glass and plastic.

14. The liquid crystal display device of claim 1, wherein the polymer stabilizer is a polymerizable monomer that dissolves into and is aligned with the liquid crystal.

15. The liquid crystal display device of claim 1, wherein the polymer stabilizer is a UV curable acrylate.

16. The liquid crystal display device of claim 14, wherein the acrylate is a diacrylate.

* * * * *